(12) United States Patent  (10) Patent No.: US 7,503,979 B2
Haller et al.  (45) Date of Patent: Mar. 17, 2009

(54) APPARATUS FOR THE APPLICATION OF A CURABLE COMPOSITION TO A FASTENER AND CURABLE COMPOSITIONS SUITABLE FOR APPLICATION TO A FASTENER

(75) Inventors: Matthias Haller, Frankfurt (DE); Martin J. Fitzpatrick, Dublin (IE); Fergal A. Gordon, Co. Kildare (IE); Karen O'Flynn, Dublin (IE); Peter Wrobel, Dublin (IE)

(73) Assignees: Loctite (R&D) Limited, Dublin (IE); Henkel Locite Deutschland GmbH, Munich (DE)

( * ) Notice: Subject to any disclaimer, the term of this patent is extended or adjusted under 35 U.S.C. 154(b) by 327 days.

(21) Appl. No.: 10/527,152

(22) PCT Filed: Sep. 11, 2003

(86) PCT No.: PCT/IE03/00122

§ 371 (c)(1),
(2), (4) Date: Nov. 21, 2005

(87) PCT Pub. No.: WO2004/024841

PCT Pub. Date: Mar. 25, 2004

(65) Prior Publication Data

US 2006/0096535 A1  May 11, 2006

(30) Foreign Application Priority Data

Sep. 11, 2002 (IE) .................................. 2002/0739

(51) Int. Cl.
*B05B 5/00* (2006.01)
*B05B 13/02* (2006.01)
*B05C 11/00* (2006.01)

(52) U.S. Cl. .......................... 118/642; 118/324; 118/667

(58) Field of Classification Search ................. 118/300, 118/324, 666, 667, 641–643; 427/510, 516, 427/409, 410, 203, 205, 236, 239; 411/82, 411/258

See application file for complete search history.

(56) References Cited

U.S. PATENT DOCUMENTS

| 5,288,526 A | * | 2/1994 | Hogan et al. ................. 427/492 |
| 5,426,130 A | * | 6/1995 | Thurber et al. ................ 522/14 |
| 6,027,568 A | * | 2/2000 | Wallace et al. .............. 118/668 |

* cited by examiner

*Primary Examiner*—Yewebdar T Tadesse
(74) *Attorney, Agent, or Firm*—Steven C. Bauman; James E. Piotrowski

(57) ABSTRACT

An apparatus (1) for the application of a composition curable by irradiation to a fastener (2) having a conveyor (3) for conveying fasteners to an application station (5); an application station (10) comprising an applicator from which the composition is dispensed. The conveyor rotates the fasteners past the applicator for application of composition. The same or another conveyor (8) conveys the fasteners to an irradiation station (10) and rotates the fasteners for irradiation thereof. The irradiation station irradiates and thus cures the composition applied to each fastener.

19 Claims, 7 Drawing Sheets

APPARATUS FOR THE APPLICATION OF A CURABLE COMPOSITION TO A FASTENER AND CURABLE COMPOSITIONS SUITABLE FOR APPLICATION TO A FASTENER

BACKGROUND OF THE INVENTION

1. Field of the Invention

The present invention relates to an apparatus for the application of a curable composition to a fastener, especially to a threaded fastener. In particular, the invention relates to an apparatus for the application of an at least two stage curable composition to a fastener. The invention further relates to curable compositions for application to a fastener, particularly by the use of the said apparatus. In particular the invention relates to adhesive compositions which are suitable for thread locking or thread sealing applications. In general the present invention relates to a polymerisable composition for the sealing and locking of engineering parts, particularly interfitting parts such as fasteners, more particularly threaded fasteners such as nuts, bolts, screws, threaded nails and the like, or parts such as pipe joints which may be threaded or slip-fitted. Compositions of the invention may be used to assemble engineering parts where close tolerances are designed between adjacent surfaces of the parts. The invention particularly relates to pre-applied compositions.

2. Brief Description of Related Technology

It is known to provide an apparatus for applying material to fasteners, in particular, threaded fasteners. One of the problems which have been associated with conventional apparatus for applying a composition includes the problem of contact marks. Contact marks arise where fasteners touch off each other during the coating process. If the coating is not dry to touch then some of the coating may come off onto another fastener, leaving a mark where contact was made (on one or both fasteners). Such marks are known as contact marks.

One of the reasons for eliminating contact mark problems includes improving the appearance of the end product. In particular, it is desirable that fasteners will have composition only where it is required and will not have small amounts of the composition on other parts of the fastener, which detract from the aesthetic appearance of the fasteners.

Having composition on undesired parts of the fastener can also deleteriously affect the handling of the fasteners by automated machines (for example, robotic machines such as robotic grippers and the like). Due to the continued automation of assembly lines and the like, it is desirable that fasteners can be handled by automated machines, for example, machines for placing the fastener in a fastening position, and/or fastening parts mechanically with the fasteners. Such automated apparatus will normally be designed to grip the fastener at a part of the fastener which has not had composition applied. This is to ensure that composition does not find its way onto the handling apparatus for the fastener. However, if composition has made its way onto other parts of the fastener (as discussed above), then it tends to come off on the handling apparatus, eventually causing problems with gripping of fasteners. It may interfere with moving parts of at least that part of the apparatus which grips the fastener and the like. Other methods of handling fasteners include pneumatic lines (often referred to as "shoots") which essentially are hollow tubes through which the fasteners are blown by compressed air pressure. The fasteners can clog up in the tubes if the interior of the tubes becomes soiled with composition due to contact of the fastener with the tube (contact marks on the interior of the tube). Accordingly it is desirable that any coating applied is substantially dry to touch when being passed through such systems.

Certain forms of apparatus which have been provided for applying coatings to fasteners include a drying oven in the form of a high temperature oven which is used to dry the composition. There are inefficiencies in the process, as the amount of energy required to dry the composition is high. Furthermore, batching the fasteners together for drying in the oven can lead to contact marks, as discussed above. Evaporation of water and/or solvent from a composition by heating may create contaminated extracted air which is another potential disadvantage.

It is desirable, therefore, to provide a handling mechanism that can carry components through both the coating and drying processes to create a dry-to-touch composition applied to the fastener without creating an opportunity for contact marks to be formed by touching (e.g. by collision) of fasteners. It is also desirable to provide a compact apparatus for application of curable composition. It is also desirable to provide an apparatus, which can have high throughput of components, which are coated, suitably in a compact arrangement.

One such handling apparatus is described in U.S. Pat. No. 6,027,568 (Wallace et al). Wallace et al. describe an apparatus and method for providing a masking, insulating and/lubricating barrier coating on a portion of threads of fasteners. The apparatus employs applicator guns, which fire a jet of composition onto the fasteners. The fasteners are conveyed along the apparatus by a conveyor and are delivered to an oven where they are dried. Accordingly, it is likely that contact marks would be formed in batching of the fasteners for drying in an oven. The compositions applied are not curable.

UK Patent Application No. GB 2 255 781 (Reactive Industries, Inc.) describes a composition which is UV-curable and which is applied to fasteners by an apparatus. The apparatus includes a conveyor having two spaced apart belts for conveying fasteners from a loading station past applicators and a heating station to a UV station. The fasteners are caught between the two belts with two opposing sides at the head of the fastener resting on the top of the belts and the stem of the fastener depending vertically downwards in which position the fasteners are held throughout the processing steps.

UK Patent Application No. GB 2 255 781 (Reactive Industries, Inc.) already mentioned above describes a composition comprising a hardener-containing component which includes (a) a hardener capable of polymerising a resin, e.g., an epoxy resin; (b) a UV curable film-forming compound comprising a dimethacrylate; and (c) a photoinitiator compound capable upon exposure to UV light of curing (b) to form an integral, thin continuous, dry, substantially pin-hole free, flexible, non-tacky outer protective skin. The hardener containing component is preferably fluid and microencapsulated and can be used in an adhesive system additionally comprising a resin-containing component which includes (1) a resin, e.g., an uncured epoxy resin which is polymerisable by the hardener component, (2) a UV-curable film-forming compound, e.g., a dimethacrylate; and (3) a photoinitiator capable upon exposure to UV light of curing the film-forming compound (2) to form an integral non-tacky outer protective skin. The resin component may be micro-encapsulated. In this system, also, the UV curing forms only an outer protective skin and the components for the second polymerization are free to move beneath the skin or, in the event of rupture of the skin, to escape from it. The film-forming compounds used are monomers, particularly dimethacrylate monomers, and there is no suggestion of use of oligomers. The rheology of the composition is not discussed and, in particular, the use of a thickener is not mentioned.

Compositions which are suitable for use in threadlocking applications are known. Such compositions find use in many applications. In general the compositions are used as described above to lock interengaging threads together. The composition is generally placed on one or both of components which have reciprocal interengaging screw threads. When the components are screwed together using the screw threads the composition acts to lock the threads in the desired interengaged position.

In general the applications in which compositions of the present invention are used include any application where it is desired to lock screwthreads together so that the components which are screwed together do not become disengaged unintentionally, for example because of vibrational or other forces. Such applications include use in the construction of automobiles etc.

Compositions have been used which must be applied at the time of threading one component into another, as the compositions remain substantially liquid before cure. Such compositions include anaerobically curable compositions.

A pre-applied composition is described in U.S. Pat. No. 4,059,136, where two physically separated deposits are applied to the threaded part. A cover coating is then applied over the deposits.

European Patent No. 0 077 659 (Thompson) describes a pre-applied polymerisable fluid for sealing and locking engineering parts. The composition has two mechanisms for curing and two curing reactions take place. The first mechanism is a UV light cure. An opacifier is dispersed in the fluid so that the fluid becomes substantially opaque to radiation. After the fluid is applied to the component it is exposed to UV radiation whereupon a coating is formed, creating a surface layer which is a dry, tack-free crust. The subcutaneous fluid is unaffected by the radiation and remains in a generally liquid state. When the component is threaded into another the surface layer breaks and the second polymerisation (such as a free radical addition polymerization ) is initiated and the second cure reaction takes place. The second polymerisation mechanism acts to lock the threads together.

In Thompson, only a skin is formed in the first polymerization and the remainder of the composition remains fluid below the skin. There is a risk therefore that during handling of the coated engineering parts the skin may be disrupted and the fluid composition may leak out.

European Patent No. 0 548 369 (Usami) describes a pre-applied adhesive composition for application to the threaded contact faces of a screw member such as a screw. The composition comprises a photo-hardening binder in which a secondary curable composition is dispersed. The secondary curable composition includes microencapsulated reactive monomer/activator/initiator. Exemplified compositions include those containing (i) microencapsulated bisphenol A dimethacrylate and a radical generator; (ii) microencapsulated bisphenol A dimethacrylate and DMPT; and (iii) Three Bond product no. 3057D. The only information given about the product 3057D is that it is a UV-hardening acrylic resin containing a photoinitiator. Other similar compositions are disclosed in the other "Embodiments" described. In two "Embodiments" bisphenol A epoxy resin is encapsulated. In one of these "Embodiments", the microencapsules enclosing bisphenol A epoxy resin are used with Three Bond product no. 3057D, salicyclic acid derivative and aromatic diamine. The present applicants have not been able to obtain a sample of Three Bond product 3057D and therefore have no information about the acrylic resin contained in it. In the other "Embodiment", the microcapsules enclosing bisphenol A epoxy resin are used with dialkylamino-acrylamide and a photoinitiator (DAROCURE 1173). There is a general indication in the description that a filler may be added but no filler is used in the "Embodiments". There is no suggestion of using a thickener, nor is there any enabling teaching about the acrylic resin. So far as the present applicants are aware, no product has been commercialised under the European Patent No. EP 0 548 369.

Notwithstanding the various compositions that have been provided it is desirable to provide an alternative composition which is suitable for use in thread sealing/thread locking applications. It is desirable that such compositions are suitable for pre-application to threaded articles, for example to bolts, for later use. It is desired that the composition can be applied to form a dry-to-touch product on the threaded article. It is also desirable that the composition can be later activated to lock threaded articles together with desirable properties of the bond formed between the threaded articles. To achieve s this the composition must be storage stable before application and then remain stable for subsequent use.

SUMMARY OF THE INVENTION

The present invention defines an apparatus and system for the application to a fastener of a composition curable by irradiation.

Accordingly, the present invention provides an apparatus for the application of an at least two-stage curable composition to a fastener comprising:
  (i) a conveyor for conveying fasteners to an application station;
  (ii) an application station comprising an applicator from which the composition is dispensed, the conveyor for rotating at least part of the fasteners past the applicator for application of composition to the fasteners;
  (iii) a conveyor for conveying the fasteners to an irradiation station and arranged to rotate the fasteners for irradiation thereof; and
  (iv) an irradiation station for curing the composition applied to each fastener.

The apparatus of the present invention is able to handle and coat various types of threaded parts, in particular, male threaded parts. The flexibility of the apparatus to coat large numbers of different parts is quite advantageous. The end-users of the parts may require an approval procedure for each type of part they use. Accordingly, if the parts are coated by different procedures, a different approval procedure may be required. This is not so with the present invention, where the same apparatus can handle different sizes of fasteners.

The apparatus of the invention is suited to high production speed, for example, greater than 16,000 pieces per hour. The apparatus may be quite compact, for example, no longer than 2 metres in length. For example typical dimensions including a feeding station are 2 m×2 m×1.5 m (height×length×width). This reduces installation and user space required. The apparatus is also relatively portable, being quite easily moved from one location to another.

The conveyor for conveying fasteners to an application station may be the same conveyor as the conveyor for conveying the fasteners to an irradiation station. Desirably however they are separate (first and second) conveyors (conveyors which can run at different speeds for application and curing). In particular it is desirable that the apparatus comprises a first conveyor for conveying fasteners to an application station, and for rotating at least part of the fasteners past the application station for application of composition to the fasteners. Suitably the first conveyor rotates the fasteners and conveys at least part of the rotating fasteners past the application station. The second conveyor can then be used to convey the fasteners to irradiation station. While most of the discussion of the present invention refers to the presence of first and second conveyors it will be appreciated that the features of the first and second conveyors may be applied, as appropriate, to a single conveyor apparatus.

In one desirable arrangement the apparatus further comprises a fastener feeder for feeding fasteners one by one to a first conveyor. This allows for timely and orderly feeding of fasteners to the first conveyor. Many conveyors are of the movable support type, i.e., of the type that support the material they carry. One example is a flat rubber belt which can carry product on its upper surface. Such conveyors do not normally continuously rotate (or roll) the material they carry. Conveyors which continuously rotate (or roll) the products they handle are desired for use in the present invention.

It has been found by the present inventors that it is desirable to adjust the temperature of the articles to which the composition is to be applied prior to the application thereof. Accordingly it is desired to include temperature adjustment means for adjusting the temperature of the articles to which composition is to be applied.

Depending on the product in question it may be necessary to cool the articles (for example if for any reason (such as ambient conditions) they are too hot (which for example will make applied composition less viscous than desired or hot enough to deleteriously affect the stability of the composition) they may be cooled. If they are too cold the composition may not move well into the wells between threads (for example due to increased viscosity).

Where it is desired to heat the articles one could therefore batch heat the articles (for example in an oven) and later supply them to an apparatus according to the invention for application of composition.

However it is desirable to heat the articles in an inline process for example before they reach, while they are passing through, or after they exit the fastener feeder. In any event it is desirable to have the articles heated before they reach the (first) conveyor.

Where pre-heating of the articles is desired hot air may be used to heat them. For example an inline hot air blower may be employed. One useful piece if equipment includes any hot air blower which can heat air and which is arranged to deliver a strong focussed blast of hot air as appropriate to achieve the desired temperature.

Conversely for cooling, batch cooling can be employed but again it is desirable to employ an inline cooling arrangement analogous to that described above for heating. In particular an air blower may also be employed. An air blower with a suitable range of temperatures for the expelled air may be employed to heat or cool as appropriate. Desirably the articles are at a temperature in the range from about 30° C. to about 60° C. such as about 35° C. to about 50° C. for example from about 40° C. to about 45° C.

Pre-setting the temperature of the articles in this way makes the temperature of the article independent from ambient temperature.

The composition should have at least two-stages of cure. The curable composition having a first cure stage which is activatable by irradiation so as to fix the composition to a fastener, and a second cure stage which is curable to secure the fastener in a fastening position. The irradiation will normally cure the first stage cure of the composition.

The first conveyor desirably extends from the fastener feeder through the application station. The first conveyor may be arranged for conveying the fasteners in a manner so that the fasteners are arranged on the conveyor in a configuration each spaced apart from the next, from the feeder to the application station (and suitably through the application station).

In particular it is desirable that the applicator comprises a surface onto which the product is dispensed. In one construction the fasteners are rolled across said surface by the first conveyor. Desirably, the applicator is provided in the form of a coating block. The coating block will have a surface across which the fasteners are rolled or such like. In particular, it is desirable that at least one dimension of the applicator may be altered (the contact made with the fastener can be varied). This allows the application of different widths of product to the fasteners. In particular, the applicator may have a contact portion for contacting composition to the fastener with a width corresponding to the width of a continuous coating layer of product that is desired to apply to the fasteners. In this respect a sufficient amount of product should be provided in the spaces (pitches or wells) between threads in the case that the fastener is a threaded one. A continuous coating layer of product in this respect refers to sufficient product within the spaces between threads of a threaded fastener. A certain amount of product may find its way onto the threads themselves. However it is desirable that the product does not completely fill or over fill the spaces between threads.

The width of the applicator can be varied to achieve differently sized coating layers of product about the fastener (usually confined to a portion of the fastener). Product will normally be continuous both circumferentially about the fastener and longitudinally along the fastener. It will be appreciated by those skilled in the art that in an arrangement where the fasteners are rolled across an applicator (with a contact portion for example with an application surface thereon) with composition thereon, a coating layer of product will be applied circumferentially about the fastener.

In one embodiment, the applicator surface is adjustable for application of different extents (coating layers) of product to fasteners. In another embodiment, the component on which an applicator surface is formed, for example, a coating block, is an interchangeable part, so that different applicator surfaces (coating blocks) are mountable on the apparatus for use. Again this allows different threaded parts to be processed by the apparatus with a minimum of equipment alteration.

Furthermore it is also desirable to have a temperature control on the applicator. In particular it may be desirable to heat or cool the applicator surface. The temperature of the applicator in turn imparts a desired temperature to the composition which is applied from it. In particular it is useful to control the applicator temperature in conjunction with controlling the temperature of the articles to which the composition is to be applied. Again this makes the application of the composition independent from ambient temperatures. All heating and/or cooling means may be controlled by a PLC (programmable logic controller) or PID (proportional integral differential) controller. Temperature may be monitored as appropriate for example by employing a suitable thermocouple.

In particular it is desired to maintain a temperature differential between the bolts and the applicator. It has been found that it is desirable to maintain a temperature difference of from about 10° C. to about 20° C., such as about 15° C. between the applicator and the articles. In particular it is desirable that the articles to which the composition is to be applied are higher in temperature than the applicator. It has been found that the colder the articles are the greater the thickness of product applied. However with cold (room temperature, 15° C. to 25° C.) articles and a non-heated applicator the amount of product which is applied (the coating or product layer) may be too great and may cause the composition applied to overfill the pitches between threads. (The product "humps" over the threads see for example FIG. 7A.) In particular it is desired that the composition between threads forms a concave meniscus shape (see FIG. 7B) so that the composition to the centre of the pitch is at a lower level than that that at the threads. In this way the coating efficiency and coating weight are balanced. The coating weight will be the minimum required to reduce peel-off and wastage. A coated article will be substantially completely covered over the entire target (circumferential) area with a thin even coating. It was found that by employing temperature as a control on coating weights works well. Suitably the applicator is at a temperature in the range of 28° C. to 35° C. such as about 30° C.

In the case where the applicator comprises a coating block it is desirable that the coating block is temperature controlled for example by placing heating and/or cooling means in the coating block. The heating means may be a heating element or cooling element or may be heated or cooled by circulated fluid such as water.

The second conveyor desirably extends through the irradiation station. The second conveyor may be arranged for conveying the fasteners in a manner so that the fasteners are arranged on the conveyor in a configuration each spaced apart from the next In particular the second conveyor is used to convey the fasteners through the irradiation station.

The fasteners need not be conveyed or otherwise moved between the first and second conveyors. For example the momentum of a fastener exiting the first conveyer may be sufficient to carry the fastener to the second conveyor where it is picked up by motion of the second conveyor. Larger fasteners (i.e., those with greater momentum) in particular may be transferred (travel) between conveyors in this way.

In one embodiment it is desirable that the apparatus further comprises a transfer station for transferring the fasteners (from the first conveyor) to the second conveyor. The transfer station may comprise a (short) conveyor which acts to convey the fasteners between the (end of the) first and the (start of the) second conveyors. This is particularly useful for smaller fasteners.

In one compact arrangement it is desirable that the total length of the first and second conveyors is reduced. This may be achieved by at least partial overlap of the conveyors. In one arrangement the total distance from a fastener receiving end of the first conveyor to a fastener exiting end of the second conveyor measured in a horizontal plane (in the operating position of the apparatus) may be up to 50% less that the total combined length of the first and second conveyors.

One of the advantages in the provision of first and second conveyors is that the speed of each conveyor to be selected may be accomplished independently from the other. In particular the speed of the first conveyor (measured as the travelling speed of a fastener) is substantially faster than the speed of the second conveyor. It is also desirable that the first conveyor is arranged to convey the fasteners with a substantially greater lateral distance between the fasteners. In one arrangement of the invention the transfer of the fasteners from the first to the second conveyor may result in the fasteners being grouped together a smaller distance apart but in any case it is described that the fasteners are a shorter distance apart on the second conveyor. For example the distance between fasteners conveying by the first conveyor is desirably 4 to 10 times the width of the fastener. (If the fastener has a head then desirably the spacing is 4 to 6 times the width of the head.) In the second conveyor the spacing is desirably 1.5 to 2.5 times the width of the fastener (or of the fastener head). The speed of the first conveyor is typically 2 to 3 times the speed of the second conveyor. Typical speeds are 0.1 to 0.5 m/s for example 0.22 m/s for the first conveyor or typically has a speed of 0.05 to 0.2 m/s such as 0.09 m/s. The reduction of speed through the second conveyor and the closer together fasteners allow for a substantial reduction in the overall length of the first and second conveyors, thus reducing the overall length of the apparatus.

In particular at least one and desirably each of the first and second conveyors of the invention comprise at least one (endless) belt which is arranged to run substantially constantly spaced apart from a rail (it is also possible to use an (endless) chain or such like but a belt is preferred). The belt and the rail are suitably arranged to grip the fasteners between them so that motion of the belt (in at least one direction) causes the fasteners to roll along the rail. In this way the fasteners can be rotated and moved along at the same time. At least one rail may run from the applicator station through to the irradiation station.

Desirably the fastener is a threaded fastener such as a bolt, screw, plug, stud, fittings and the like. Typically the threads of the fastener engage with reciprocal threads of a receiver for the fastener for example a threaded bore or nut and the composition (in particular stage two thereof) is activated on screw thread engagement of the fastener to act as a threadlocking composition to lock the threads together or as a thread sealant composition to provide a seal about (the threads of) the fastener. Threadlocking compositions are well known to those skilled in the art, desirably both the threadlocking and thread sealing compositions will have the two stage cure system described above. In particular it is desirable that the composition applied by the apparatus of the invention is a one-part composition (having a two-stage cure).

Desirably, the fasteners are conveyed by at least the first conveyor (and desirably the second conveyor also) so that they are substantially horizontal. The fasteners will normally be threaded. They may or may not have a head. The fasteners may or may not be ferromagnetic (e.g., steel, brass or stainless steel).

In one particularly desirable arrangement, the fastener comprises a first end and a second end with a stem portion between the first and second ends. Desirably, the apparatus comprises a rail for supporting the stem of the fastener at least one location thereon (at least while the fastener is being conveyed by the first conveyor). Desirably, a rail is provided also, for supporting the fastener when it is conveyed by the second conveyor.

In one particularly desirable arrangement, two spaced apart rails are provided to support the fastener at least two positions thereon. It is desirable that neither of said two positions coincides with the part of the fastener which has had, or is for, application of composition at least until the fastener is sufficiently far through the apparatus so that the composition is dry to touch.

The fasteners may typically be in the range from 5 mm up to 200 mm in length. Such fasteners do not need a head for transportation or for guidance along the apparatus. The invention is particularly suitable for use with threaded fasteners having a head portion and a stem portion thereon.

In one particularly desirable arrangement, suitably the rail or rails for supporting the fastener are adjustable so that different sizes (lengths) of fasteners may be accommodated by the apparatus. In particular, where two rails are provided, it is desirable that they are adjustable relative to each other so that the spacing between the rails may be varied as desired.

Such rails are desirably of a narrow width, for example, between 1 mm and 5 mm in thickness. Desirably, two parallel rails are provided. Product may be applied to the portion of the fastener that is arranged to lie between the rails.

Desirably, the application station comprising a supply system for supplying curable composition to the flat applicator surface. In one embodiment, desirably the component on which the flat applicator surface is formed has one or more apertures defined therein which pass to and through the applicator surface so that the product may be provided through the apertures to the applicator surface.

Desirably, the conveyor comprises a belt of material, desirably flexible material. In particular, it is desirable that the belt comprises resiliently deformable material, and in one embodiment of the invention, comprises O ring material. An O ring is a closed loop of material where the cross section of the material making up the ring is substantially circular (O-shaped).

Desirably the supply system for supplying composition to the application station contains a product supply, which is operated by volumetric supply.

Alternatively or additionally the supply system for supplying composition to the application station includes a time/pressure control system such as an air-pressurised line which pushes product from a product reservoir along a conduit toward the applicator. In the case where both a time/pressure system and a volumetric system are employed it is desirable that the time/pressure system feeds product to the volumetric control system, which in turn supplies the product to the applicator station. Desirably, a control is provided for controlling the rate of product supply.

It has been found that the inclusion of a volumetric system results in a much more convenient system as a user of the system has no longer to continually adjust the supply of the product due to ambient changes such as pressure/temperature change. In particular it is difficult with a direct feed to the applicator station from a time/pressure system to control supply rate where the product to be supplied is viscous.

Accordingly the present invention also provides a feed supply system for supplying a composition to the application station of an apparatus of the invention the system comprising:

(i) a volumetric supply pump for taking product from a product supply and supplying the composition to the application station in a volumetrically controlled fashion; and (ii) a control for controlling the supply rate of the pump.

Mechanical handling of the product may cause the product to prematurely cure and thus deleteriously affect the composition and the apparatus. For example where the composition includes a microencapsulated component any mechanical handling can cause shear forces which rupture the microcapsules causing premature curing of the composition rendering it substandard perhaps to the point of being completely useless, and also contaminating the apparatus with the cured product. Neither of these is desirable.

Surprisingly it has been found that an eccentric rotor pump can be used as part of the feed supply system of the present invention, which of course may in turn be used as part of the apparatus of the present invention.

Generally an eccentric rotor pump will include a rotor and a stator, the rotor being a single helix shape and the stator being a double helix shape. In general the rotor and stator will together form a closed cavity along which the composition is pushed by relative rotation of the rotor and the stator.

In conjunction with such a system it is desirable to calculate a desired amount of product per fastener and set the fastener feed rate and the product supply rate. Once the fastener and the composition to be employed have both been selected the feed supply can be calibrated so that a desired amount of product can be provided to the fasteners in a predictive fashion. There will be no need for continual adjustment of the supply rate for pressure/temperature differences.

A conduit which takes the composition from the volumetric supply pump to the applicator station is desirably both relatively short and rigid. Reducing the length and avoiding a flexible conduit (such as a flexible hose) may allow better volumetric control to be achieved, as flexing of the conduit, particularly over relatively long lengths can be avoided.

With a product supply system such as described above the amount of product to be supplied will (once a fastener type is selected for application of composition) depend on the rate at which the fasteners are throughput.

The applicator desirably has a spreading surface onto which the composition is dispensed. The spreading surface may or may not be recessed so that product is present below a surface of the applicator across which the fasteners are rolled.

The products coated by the apparatus of the present invention are dry to touch, and thus can be collected in batches (in contact with each other) without fear of contact marks developing on some of the components. The present invention achieves substantially no contact marks on pieces, which have been processed by the apparatus of the present invention. For example, even with 16,000 pieces an hour being processed, very low percentages of these products would have to be rejected due to contact marks. Contact marks would generally appear on less than 1% of the pieces and, in particular, less than 0.1% of pieces using the process of the invention. Markings on less than 0.035% of fasteners has been achieved while 0.005% or less is possible (50 pieces in a million).

Desirably, the irradiation station comprises a UV light source for irradiating product with UV light. In such instances, it is desirable that the first cure stage of the curable composition is activatable by UV light. Desirably, the UV light source is a high intensity lamp, typically having an output of 120 W/cm. The fastener may experience an intensity of 40 m/Wcm$^2$. Desirably the irradiation station comprises a focused radiation emitting source, such as for example a focused UV source for example the light source may be housed in a reflective housing which focuses the UV light into a narrow coating layer. For larger bolts in particular the irradiation time is not so critical and a lower intensity source may be used.

It will be appreciated by those skilled in the art, that the limit of the capacity of the apparatus of the present invention to carry articles for application of coating is limited by the smallest size of conveyor that can convey the piece and leave sufficient of the fastener unobstructed for application of a coating.

Desirably, the first conveyor and the application station are arranged in-line.

The apparatus of the invention is used for application of an at least two-stage curable composition. In another aspect this application relates to a composition suitable for use with the apparatus.

The present invention provides in one aspect a curable composition suitable for use in threadlocking applications comprising:

(a) a (meth)acrylate functional monomer component;

(b) a (meth)acrylate functional oligomer component;

(c) a photoinitiator component;

(d) a thickener component;
(e) an amine component; and
(f) an encapsulated epoxy resin component.

Optionally, additionally the inventive composition may include an acrylamide component, which may be present within any one or a number of the components (a) to (f) above or may be present otherwise. In particular, an acrylamide, such as N,N-dimethylacrylamide, may suitably be used.

The inventive compositions have desirable properties, such as forming a dry to touch (tack-free) product following application to a threaded component in a liquid state and subsequent UV cure to its dry state. UV cure of compositions of the invention occurs right through the depth of the product on the threaded article and the cured product is not only dry to touch but is substantially dry (substantially solid) throughout the entire matrix it forms. Within that matrix the components for the second cure mechanism are held.

In particular, compositions of the invention have a first and second cure mechanisms so that first and second cure reactions take place. In a first cure mechanism/reaction the composition is UV hardenable to form a solid binder matrix within which components of the secondary cure mechanism are held. In particular components (a)-(d) form the UV hardenable binding matrix. Components (e) and component (f) (amine and encapsulated epoxy) are the subject of a second cure mechanism/reaction. These latter components are held within the binder matrix once a UV cure has been carried out.

Compositions of the invention should not contain any opacifier component which renders the composition substantially opaque to cure-initiating radiation. Cf. Thompson.

In a particular aspect the present invention provides a curable composition for application to a threaded article, comprising a dispersion of:
(i) components of a first cure mechanism comprising:
  (a) a (meth)acrylate functional monomer component;
  (b) a (meth)acrylate functional oligomer component; and
  (c) a photoinitiator component;
(ii) components of a second cure mechanism comprising:
  (e) an amine component; and
  (f) an encapsulated epoxy resin component; together with
(iii) a thickener component suitable to impart sufficient viscocity to the uncured composition to maintain the dispersion of the other components in the composition; where the photoinitiator component is suitable upon irradiation of the composition to achieve a first cure through the depth of the composition applied to a threaded article so that a binder matrix is formed with the components of the second cure mechanism dispersed through the matrix.

It is important, in particular, that microcapsules containing the epoxy resin remain dispersed through the composition before and after the first cure.

The viscocity of the composition containing components (a) to (e) but excluding component (f) is suitably within the range of 300 mPas to 3,000 mPas when measured by Haake Roto Visco 1, C60/1° Cone, shear rate=244 $s^{-1}$.

The second cure mechanism is subsequently activated by rupture of the microcapsules within the binder resulting in reaction of amine with the epoxy component which is released from the microcapsules. The second cure mechanism then acts to lock the threads together. Good bond strengths are achieved as measured by the torque required to unlock threaded articles locked to each other by compositions of the invention from each other.

Apart from the requirements for suitable cure properties of the first and second cure mechanisms, there are a number of other properties the composition should have in order to be particularly useful as a thread locking or thread sealing composition. One such property relates to the UV curable portion of the composition. That portion of the composition should cure to form a flexible but dry solid on the threaded article to which it is applied. Furthermore, that portion of the composition should also act as a suitable matrix for the dispersion of the microcapsules and the amine. It has been found that in compositions of the present invention the UV curable part of the composition cures to form a dry product with desired flexibility. Furthermore it acts as an excellent matrix within which the microcapsules and the amine can be dispersed.

Flexibility of the UV cure product is desirable so as to allow for the cured material to be carried with the threads into contact with the reciprocal threads with which they will be engaged. If the product is too brittle it will not travel well with the screw threads and would be inclined to be sheared or pared off by the screw thread action at the point of entry of one set of threads with the other and thus not reach the desired location further down the screw threads. Bond strengths would be poor. If the material is too soft then it may not be sufficiently robust for handling and may be removed accidentally, such as in automated equipment handling. An amount of rupture of the microcapsules might also result from handling as the microcapsules may not be so well protected from damage during handling. In general bond strengths would be poor if epoxy material had (leaked from the microcapsules and) cured prior to the screw threading action. The compositions of the present invention demonstrate the required amount of flexibility without being too brittle in nature.

In particular it is desirable that the component (a) comprises an acrylate monomer. Acrylate monomers have been found to be particularly suitable with the compositions of the present invention. Any mono-, di-, or tri-functional acrylate may be employed.

Specific examples of methacrylate functional monomers which may be employed in the present invention include: hydroxy ethylmethacrylate, lauryl methacrylate, isobutyl methacrylate, hydroxy propyl methacrylate, isobornyl methacrylate and methyl methacrylate.

Specific examples of acrylate functional monomers which may be employed in the present invention include: ethoxylated (3) phenol monoacrylate such as Photomer 4039 from Cognis; ethoxyethoxyethyl acrylate; bisphenol A epoxy diacrylate; isobornyl acrylate; acrylated adhesion monomer such as Craynor 131B from Cray Valley, a diacrylate such as Photomer 4127F from Cognis; 1,6-hexanediol diacrylate; acrylated polyester adhesion promoter such as Craynor 704 from Cray Valley; and methylacrylamide; acidic mono and triacrylates such as SR9050, SR9051 from Sartomer. It is particularly desirable to include an acrylamide, preferably N,N-dimethylacrylamide, which has been found to contribute to the cure strength of the product.

Desirably component (a) comprises a combination of acrylate functional monomers. In particular it is desirable that component (a) comprises a combination of mono- and di-functional acrylate. The cure product of compositions of the invention including a combination of monomers has been found to have desirable properties including suitable adhesion properties of the binder to keep the cured product on the article to which it is applied and UV cured.

Suitable combinations of acrylates include a first ingredient selected from: Ethoxylated (3) phenol monoacrylate such as Photomer 4039 from Cognis; ethoxyethoxyethyl acrylate; bisphenol A epoxy diacrylate; isobornyl acrylate; diacrylate such as Photomer 4127F from Cognis; and 1,6-hexanediol diacrylate; and a second ingredient selected from:

N,N-dimethylacrylamide; and/or an acrylate polyester adhesion promoter such as Craynor 131B or Craynor 704 from Cray Valley, methylacrylamide; acidic mono and tri-acrylates such as SR9050, SR9051 from Sartomer.

It has been found that it is desirable to select component (b) from among acrylate functional oligomers. The nature of an oligomer is well understood by those skilled in the art. Again (particularly in combination with an acrylate monomer as component (a)) selecting this material in this way gives desirable cure properties to the UV curable binding material and contributes to the viscosity which is desirable for maintaining dispersion of the components in the composition. From among suitable acrylate functional oligomers it has been found that epoxy acrylate and urethane acrylate functional oligomers result in desirable properties.

Specific examples of acrylate functional oligomers which may be employed in the present invention include those given below as epoxy acrylate or urethane acrylate materials and additionally polyether acrylate such as Genomer 3497 from Cray Valley.

Suitable epoxy acrylate materials include:

bisphenol A epoxy acrylate such as Craynor 104 from Cray Valley or Craynor 115 (Lower viscosity version of Craynor 104) from Cray Valley; modified tetrafunctional epoxy acrylate such as Craynor 190 from Cray Valley.

Suitable urethane acrylate materials include aliphatic urethane materials and also resins prepared in accordance with International Patent Publication No. WO 98/31655 and U.S. Pat. No. 4,295,909 (Baccei); Flex Resin II and Acryflex from Henkel Loctite; Genomer 1122 from Rohm AG; Ebecryl 230, 270, 3500, 8402 and 4842 from UCB/Radcure; and Craynor 965 from Cray Valley.

More particularly it has been found that where component (b) comprises a combination of epoxy acrylate and urethane acrylate functional oligomers, cure products with the types of desirable properties set out above are achieved.

As with the other components of compositions of the present invention it is desirable that component (c), the photoinitiator component, may be chosen to have specific properties.

The photoinitiator can be selected from among: phosphine oxides; hydroxyketones and morpholino compounds.

Suitable photoinitiators include:

diphenyl (2,4,6-trimethylbenzoyl)phosphine oxide; 1-hydroxycyclohexyl phenyl ketone; bis (2,4,6-trimethylbenzoyl)-phenylphosphine oxide such as Irgacure 819 from BASF; 2,2'-dimethoxy-2-phenylacetophenone; 2-benzyl-2-(dimethylamino)-1-[4-(4-morpholinyl)phenyl]-1-butanone; 2-methyl-1-(4(methylthio)phenyl)-2-moropholino-1-propane; bis (2,6-dimethoxybenzoyl)-2,4,4-trimethyl pentyl phosphine oxide; and 1-hydroxy-cyclohexyl-phenyl-ketone (a blend of 25:75 of the latter two components may be employed).

For example it is important to achieve good cure through volume (CTV). It has been found that selection of certain photoinitiators can improve the CTV achieved. Therefore it is desirable that component (c) comprises a component which enhances depth of cure. Without such a depth of cure the product may remain partially uncured on a threaded article to which it is applied, which is undesirable. Suitable photoinitiators which achieve this effect include photoinitiators with phosphine oxide functionality such as diphenyl (2,4,6-trimethylbenzoyl)phosphine oxide; bis (2,4,6-trimethylbenzoyl)-phenylphosphine oxide and bis (2,6-dimethoxybenzoyl)-2,4,4-trimethyl pentyl phosphine oxide. Photoinitiators with phosphine oxide functionality have also been found not to impart a yellow colour which may be imparted by other photoinitiators. Such photoinitiators can be considered "non-yellowing".

Another important factor in achieving a dry (tack-free) product is achieving sufficient surface cure of the composition. Without sufficient surface cure of the composition it will remain wet/tacky to touch. It has been found that selection of certain photoinitiators can improve the surface cure achieved. Therefore it is desirable that component (c), the photoinitiator component, includes a component which enhances surface cure is also desirable to achieve a suitable end product. Suitable photoinitiators which achieve this effect include: hydroxy ketones, e.g., α-hydroxy ketones. Specific photoinitiators that may be used include: 1-hydroxycyclohexyl phenyl ketone; 2,2'-dimethoxy-2-phenylacetophenone; 2-benzyl-2-(dimethylamino)-1-[4-(4-morpholinyl)phenyl]-1-butanone; and 4-hydroxycyclohexyl phenyl ketone.

Utilising a combination of (i) a component which enhances depth of cure, and (ii) a component which enhances surface cure as a photoinitiator is particularly useful. In this respect it has been found that utilising a combination of a photoinitiator with phosphine oxide functionality and a photoinitiator with hydroxy ketone functionality is desirable. Typical ratios of use are 20:80 to 30:70 such as 25:75 respectively.

The thickener component also plays a part in the compositions of the present invention. In particular it is desirable to include a thickener component to thicken the uncured formulation which is usually liquid. The thickening of the composition imparts sufficient viscosity to the composition so that it has the physical properties to allow and maintain the dispersion of the other components in the composition, in particular prior to UV cure. In particular it is desirable that the microcapsules remain dispersed throughout the composition. If the composition was not sufficiently viscous the settling out of components may occur. This might result in the first cure reaction not sufficiently curing the binder composition throughout its mass. Secondly the components of the second cure mechanism, in particular the microencapsulated epoxy component, may become localised in one part of the composition (for example at the bottom of a mass thereof) and when the UV cure takes place the binder does not contain an even distribution of the components of the second cure mechanism. Accordingly, subsequent rupture of the microcapsules and reaction thereof with the amine may not result in a desired bond strength between threaded components.

The thickener component [component (d)] may be selected from organic thickener materials such as waxes and polymeric thickeners and also inorganic thickener materials such as silica.

Suitable organic materials include:

polymethyl methacrylate (PMMA) granules; polyethylene materials; fluoropolymers including polytetrafluoroethylene (Teflon™) materials; nylon materials; and co-polymer materials such as methyl/n-butyl methacrylate copolymer. Any of the foregoing may be provided in powder form.

Gums such as xanthum gum (also polymeric) may be utilised also.

Silica has been found to be a very useful thickener component in accordance with the present invention. It achieves the necessary thickening of the composition without interfering to any substantial extent with the first or second cure mechanisms.

Suitable silicas, such as fused silicas, may be untreated or treated so as to alter the chemical nature of their surface. Virtually any reinforcing fused silica may be used.

Particularly desirable silicas have a low ion concentration and are relatively small in particle size (e.g., on the order of about 12 μm, with a median of up to about 30 μm and as low as less than about 2 μm), such as the Silbond materials, commercially available under the tradename Aerosil 200, supplied by Degussa.

Other materials may be added as (inorganic) thickener components and include those constructed of or containing aluminum oxide, silicon nitride, aluminum nitride, silica-coated aluminum nitride and micronized quartz, provided they are not basic in nature.

Desirably, component (e) may be a tertiary amine. Tertiary amines have in particular been found to have a suitable rate of cure were used in combination with the epoxy material released from the microencapsulated epoxy materials of the present invention. Teritary amines are also likely to provide a better shelf life for compositions containing acrylate monomers than would be the case with primary or secondary amines. Included within the scope of the invention are amines where the nitrogen atom forms part of a heterocyclic group such as a substituted or unsubstituted pyridine group. Those tertiary amines which are useful in the present invention include hindered tertiary amines. Of hindered tertiary amines which are useful, the subgroup of hindered aromatic tertiary amines are of note. Specific amines useful in the present invention include: 1,3-di(4-pyridyl)propane(dipyr); modified polyamine such as Ancamine K54 from Air Products; primary amine such as 4,4'-diaminodicyclohexylmethane; secondary amine such as 1,3-di-4-piperidylpropane; biaryl containing amine substituents such as Kayahard A-A or Kayahard A-B from Nippon Kayaku. Dipyr is a very effective material in this respect. The subgroup of hindered tertiary biaryl amines are of note.

Component (f), the epoxy material, which is microencapsulated includes many common epoxy resins, such as those having monofunctionality and multifunctionality (for example those having two or more epoxy groups per molecule). Examples of such epoxy resins with monofunctionality include $C_4$-$C_{28}$ alkyl glycidyl ethers; $C_2$-$C_{28}$ alkyl- and alkenyl-glycidyl esters; $C_1$-$C_{28}$ alkyl- and mono-phenol glycidyl ethers. Examples of such epoxy resins with multifunctionality include poly-phenol glycidyl ethers; cycloaliphatic epoxy resins; polyglycidyl ethers of pyrocatechol, resorcinol, hydroquinone, 4,4'-dihydroxydiphenyl methane (or bisphenol F), 4,4'-dihydroxy-3,3'-dimethyldiphenyl methane, 4,4'-dihydroxydiphenyl dimethyl methane (or bisphenol A), 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris(4-hydroxyphyenyl) methane; polyglycidyl ethers of the chlorination and bromination products of the above-mentioned diphenols; polyglycidyl ethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain halogen paraffins containing at least two halogen atoms; phenol novolac epoxy resins; cresol novolac epoxy resins; and combinations thereof.

Among the commercially available epoxy resins suitable for use herein are polyglycidyl derivatives of phenolic compounds, such as those available under the trade names EPON 828, EPON 1001, EPON 1009, and EPON 1031, from Shell Chemical Co.; DER 331, DER 332, DER 334, and DER 542 from Dow Chemical Co.; GY285 from Ciba Specialty Chemicals; and BREN-S from Nippon Kayaku, Japan. Other suitable epoxy resins include polyepoxides prepared from polyols and the like and polyglycidyl derivatives of phenol-formaldehyde novolacs, the latter of which are available commercially under the trade names DEN 431, DEN 438, and DEN 439 from Dow Chemical Company. Cresol analogs are also available commercially under the trade names ECN 1235, ECN 1273, and ECN 1299 from Ciba Specialty Chemicals. The cycloaliphatic epoxy resin, UCB CAT-002, available commercially from UCB, is desirable as well. SU-8 is a bisphenol A-type epoxy novolac available from Shell Chemicals (formerly, Interez, Inc.). In addition, UVR-6105 and 6110 (each 3,4-epoxycyclohexylmethyl-3,4epoxycyclohexane carboxylate) and UVR-6128 [(bis-(3,4-epoxycyclohexyl)adipate], each available commercially from UCB Chemicals, are desirable for use herein, with the latter being particularly desirable. And of course combinations of the different epoxy resins are also desirable for use herein.

The capsule itself is desirably a double walled capsule. An example of a double walled capsule is one including walls constructed of gelatin and/or polyoxymethylene urea (PMU).

Desirably the concentration of epoxy resin component within the capsule is between 40 and 100%, more typically 50 to 80%, suitably 50 to 70% for example 50 to 60% (weight/weight).

In any event to ensure good cure, particularly of the second cure mechanism desirably the amount of epoxy which is introduced with the microcapsules and which is not internally held in the microcapsules prior to their rupture by screw threading is desirably less than about 0.5% by weight of the total composition. Epoxy may be carried externally with the microcapsules or may be released on premature rupture of the microcapsules. This means that the second cure mechanism reaction will be substantially unaffected.

It has been found that the mean diameter of the microcapsules is desirably in the range of from about 100 μm to about 140 μm though it will be appreciated that individual capsules may have a diameter well outside these mean ranges. For example individual microcapsules can have a diameter in the range of from about 50 μm to 200 μm. Suitably the mean diameter is in the range from about 110 μm to about 130 μm. Typically the mean diameter will be about 120 μm.

A further component which is suitable for use in compositions of the present invention is a plasticiser component. While many plasticiser components may be utilised, it is desirable that the plasticiser is a polymeric one such as PMMA. Other plasticisers may also be included in the inventive composition examples of which include those available commercially from Union Carbide, such as under the trade designations TONE Polyol 301 and 310. Other suitable plasticiser components include expandable plastic such as those sold under the trade name EXPANCEL. According to information from the website http://www.expancel.com/, EXPANCEL is a registered trade-mark for microspheres which are small spherical plastic particles. The microspheres consist of a polymer shell encapsulating a gas. When the gas inside the shell is heated, it increases its pressure and the thermoplastic shell softens, resulting in a dramatic increase in the volume of the microspheres (by a factor of 40). The specific material which can be used is DE 80 or DE 30. It is useful that compositions of the present invention can have a colour imparted thereto. Usually, pigments can be added to the compositions of the present invention without any substantive interference in the first or second cure mechanisms. It is useful to impart a colour to compositions of the present invention, as the colour can be used as a product indicator in many ways, usually to allow for ease or recognition, for example, to indicate a particular size of bolt or nut, the customer to whom the threaded article with the pre-applied product should be delivered.

Suitable pigment components include coloured metal complexes for example Fe and Co complexes. Specific examples include:

Rocket Red T-13 (organic pigment based on a thermoset resin matrix including an Fe complex material available from Dayglo Color Corp); also Laser Red 2 and Laser Red 3 with similar chemistry and available from Sterling;

Cobalt aluminate complexes such as the product PK5091 from Ferro B. V. and Comet Blue 3 from Swada (both Cobalt aluminate blue spinel materials);

V-9248 Blue (Cobalt chromite blue-green spinel from Ferro B. V.);

F-5686 Turquoise (Cobalt chromite blue-green spinel Co(Al, Cr)$_2$O$_4$:MgO:ZnO from Ferro B. V.).

In general Fe complexes impart a red colour whereas Co complexes impart a blue colour. It is unusual to be able to colour materials which are to be cured by UV light with a blue pigment as a blue pigment normally interferes to a substantial extent with the cure process by absorbing UV light.

Suitable amounts for the components of the UV binder part of the composition based on weight by weight percentage based on that part of the composition excluding the microencapsulate epoxy component (i.e., the composition excluding the microcapsules being taken as 100% of the weight) may be selected independently of one another as follows:

(meth)acrylate functional monomer, 25 to 45% more typically 30 to 42% suitably 32 to 40% for example 33 to 38%;

(meth)acrylate finctional oligomer, 35 to 55% more typically 39 to 52% suitably 41 to 50% for example 43 to 48%;

photoinitiator, up to 15%; more typically 1 to 12% suitably 3 to 10% for example 5 to 8%;

thickener, up to 14% more typically 1 to 11% suitably 2 to 9% for example 4 to 7%; and amine, 2 to 14% more typically 4 to 14% suitably 6 to 12% for example 8 to 10%. Suitable combinations are disclosed above, where component (a) comprises a combination of (meth) acrylate functional monomers: one of the monomers is typically present in the range of 15 to 29%, more typically 17 to 27%, suitably 19 to 25%, for example 21 to 23%, whilst a second monomer is typically present in the range of 7 to 21%, more typically 9 to 19%, suitably 11 to 17%, for example 13 to 15%;

where component (b) comprises a combination of (meth) acrylate oligomers: one of the oligomers is typically present in the range of 22 to 38%, more typically 24 to 36%, suitably 26 to 34%, for example 28 to 32%, whilst a second oligomer is typically present in the range of 7 to 22%, more typically 9 to 20%, suitably 11 to 18%, for example 13 to 16%;

where component (c) comprises a combination of photoinitiators: one of the photoinitiators is typically present in the range of 0.2 to 9%, more typically 0.4 to 7%, suitably 0.6 to 5%, for example 0.8 to 3%, whilst a second photoinitiator is typically present in the range of 1 to 12%, more typically 2 to 10%, suitably 3 to 8%, for example 4 to 6%; and where component (d) comprises a combination of thickeners: one of the thickeners is typically present in the range of 0.5 to 10%, more typically 1 to 8%, suitably 2 to 6%, for example 3 to 4%, whilst a second thickener is typically present in the range of 0.2 to 9%, more typically 0.5 to 7%, suitably 0.7 to 5%, for example 0.9 to 3%.

As already stated ranges are based on weight by weight percentage based on that part of the composition excluding the microencapsulate epoxy component (i.e., the composition excluding the microcapsules being taken as 100% of the weight).

In particular the compositions of the invention are generally made up by preparing the UV curable binder portion thereof and the amine and then dispersing within that composition the required amount of microencapsulated epoxy component. For convenience therefore we will refer to the ratio of the "binder composition" or "acrylate portion" as that part of the composition including all of the components other than the microcapsules and the "microcapsule portion" as referring to the amount of the microcapsules.

Generally the ratio of mixing by weight of the binder composition to the microcapsule portion is 50-70:30-50. The ratio of each will be selected so that the combined ratios add to 100.

Typically the plasticiser component will be present in an amount of less than 3% by weight of the total composition.

Typically the pigment may be present in an amount from about 0.1 to about 0.5% by weight of the total composition, such as from about 0.2 to about 0.4%, for example from about 0.25 to about 0.35%.

The inventive composition can be stored for use as either a one-part or a two-part composition. When formulated as a two-part composition, the first part of the composition may comprise;

(i) a (meth)acrylate functional monomer,
(ii) a (meth)acrylate functional oligomer,
(iii) a photoinitiator,
(iv) a thickener,
(v) an amine, and optionally additionally one or both of;
(i) a plasticiser
(ii) a pigment component.

whilst the second part of the composition will usually comprise the encapsulated epoxy resin.

A composition stored as a one-part composition has a shelf life of at least one week. Whereas a composition stored as a two-part composition, the first part of the composition has a shelf life of at least 6 months at 5° C., and the second part has an indefinite shelf life. When the two-part composition is mixed prior to use, the resulting composition has a shelf life of at least one week.

Subsequent to the first stage cure of the composition, the chemistry of the composition can confer reduced "peel off" of the composition on a threaded bolt following the second stage cure, depending upon the design of the bolt/nut joint.

The invention extends to apparatus substantially as described herein with reference to and/or as illustrated in the accompanying drawings.

BRIEF DESCRIPTION OF THE DRAWINGS

FIG. 7A showing an excess of applied product and FIG. 7B showing a desirable amount of applied product.

DETAILED DESCRIPTION OF THE INVENTION

Figure 1:
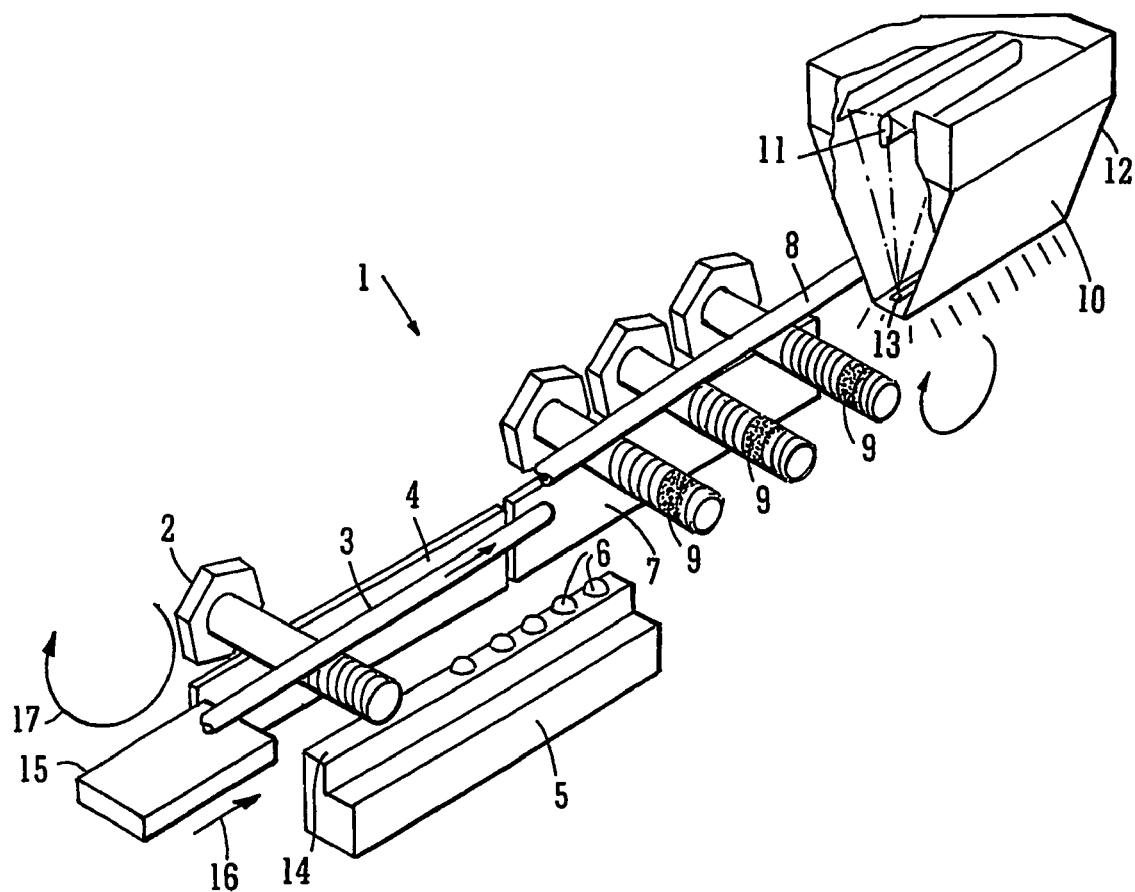
FIG. 1 is a schematic representation of an apparatus according to the present invention.

FIG. 1 shows a schematic representation of an apparatus according the present invention. The apparatus is for the application to fasteners of a curable composition. The two-stage composition is desirably a one-part composition having at least two cure stages. The advantage of using a one-part composition is that application of the composition can take place in one step. If the composition is a two-part composition then application of the two-parts of the composition normally takes place separately as mixing of the two-parts of the composition will cause the composition to cure.

The apparatus 1 has a conveyor for conveying fasteners 2 to an application station which in the embodiment is a coating block 5. A first conveyor is provided which includes an endless belt 3 (in FIG. 1 only part of the belt is shown), which conveys the fasteners or bolts to the coating block 5. It will be noted that the endless belt 3 picks up the fasteners 2 and conveys them through the application station. The conveyor 3 extends through the application station (passing across the coating block 5).

Figure 2:
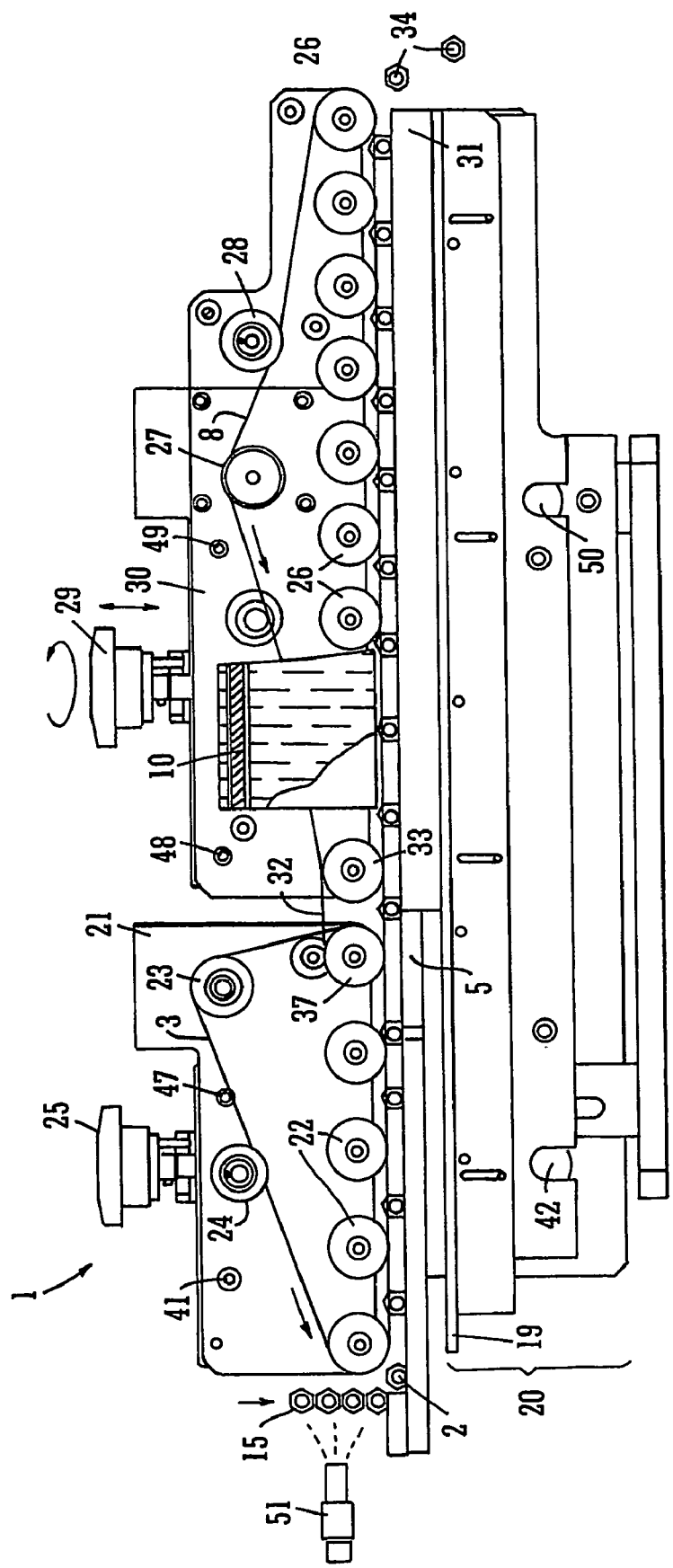
FIG. 2 is a side elevation showing a more detailed construction of an apparatus of the present invention.
Figure 3:
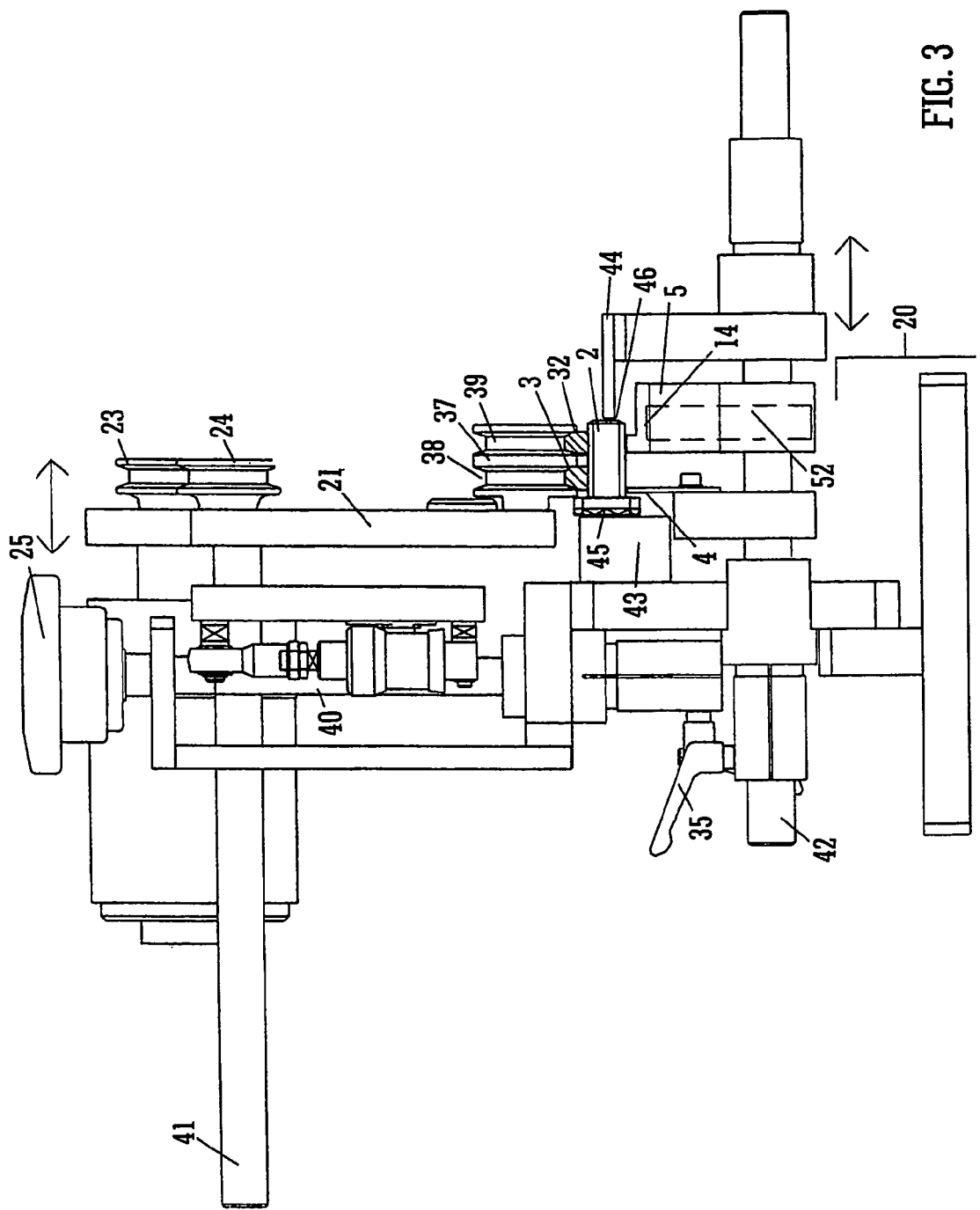
FIG. 3 is an end part sectional view of the apparatus of FIG. 2 (from the left end thereof)
Figure 4:
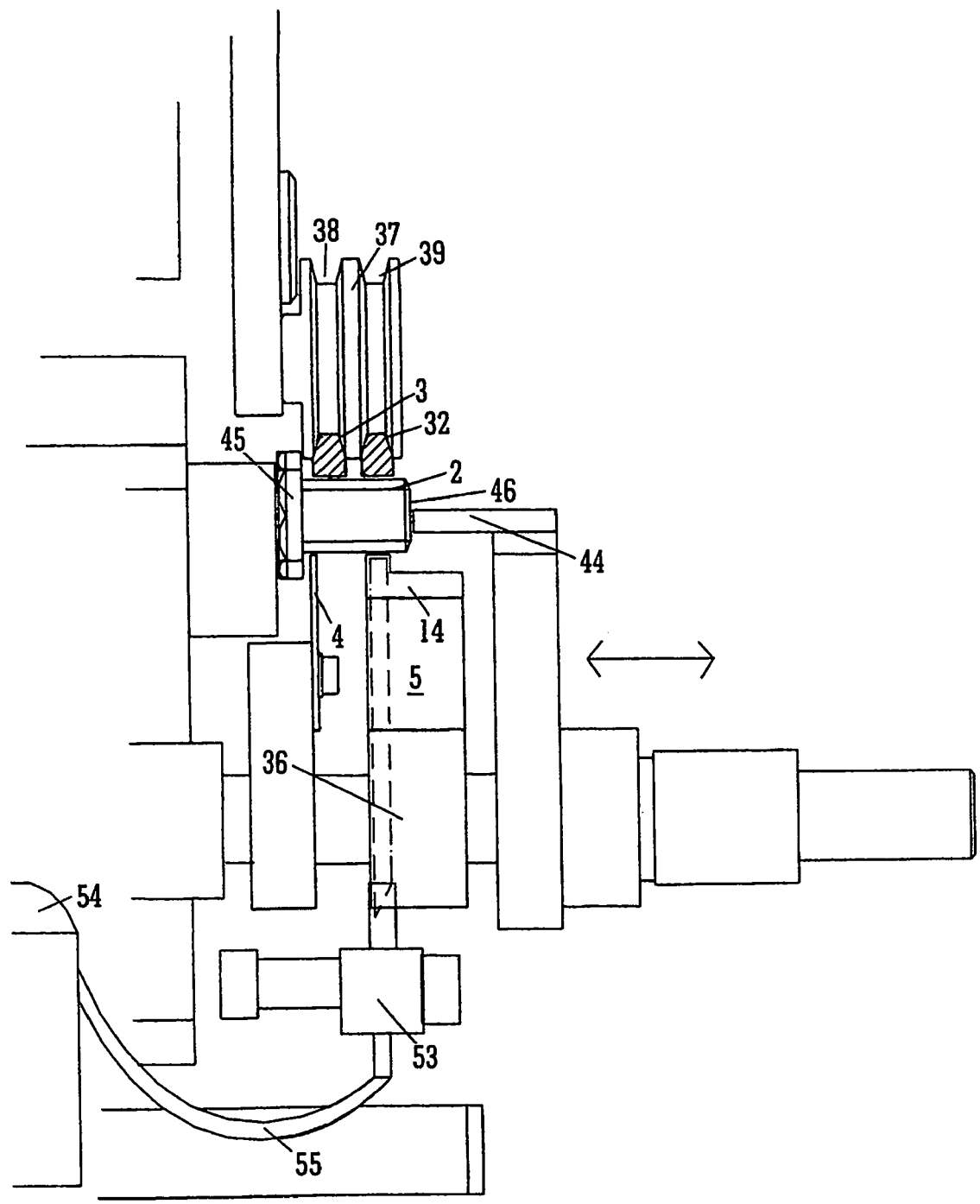
FIG. 4 is an enlarged partial view similar to that of FIG. 3.

The coating block 5 is a component of the apparatus that is replaceable and different sizes of coating blocks can be used to achieve different amounts of applied product on the fasteners. With reference to FIGS. 2-4 also provided is a second conveyor in the form of an endless belt 8 which is for conveying fasteners 2 to an irradiation station which in the embodiment is a focused UV light assembly 10. In particular the assembly 10 has a UV emitting light 11 housed in a closed housing 12 (in FIG. 1 the housing is shown in part cut-away to show the internal UV light). An elongate aperture 13 is formed in the base of the housing 12, which allows a narrow band of UV light to escape from the housing 12. A cover (such as a sliding cover) may be provided over the slot. The narrow band of UV light is arranged to be coincident with a coating layer of applied composition 9 on the fasteners.

The coating layer of applied composition 9 is achieved by rotating the fasteners across the coating block 5. In particular the coating block 5 has a contact portion for contacting the composition with the fastener. The contact portion is provided in the form of an application surface 14 (on coating block 5) onto which the two-stage curable composition is dispensed. In the embodiment shown, beads 6 of the (liquid) composition are dispensed onto the application surface 14 from the underside of the coating block 5. This may be achieved by providing apertures in the coating block which open onto the application surface 14 and for example using a conventional dispensing system such as an air-pressurised line 55 which feeds product to an eccentric rotor pump 53 which in turn supplies product to the coating block 5 (best seen from FIG. 4). The apparatus 1 also has a rail 4 (see also FIGS. 3 and 4), which supports the fastener close to one end of the fastener (the end closest the head). The fasteners 2 are gripped between the belt 3 and the rail 4 sufficiently well so that movement of the belt 3 in the direction of the arrow 16 (left to right in the orientation shown in FIGS. 1 and 2) results in the bolt moving in the direction of the arrow 16 all the while rotating (rolling) as indicated by arrow 17.

In the embodiment the coating block 5 forms (part of) a second rail which also supports the fastener 2. Movement of the belt 3 thus causes the fasteners 2 to rotate across rail 4 and application surface 14 of the coating block causing each fastener to roll through the product 6 thus creating a coating layer 9 of applied composition. It will be appreciated that rotation of the fastener is about a longitudinal axis thereof.

As shown in FIG. 3 the coating block is temperature controlled by a temperature control element 52 which can be used to raise and lower the temperature of the coating block (in particular an applicator surface thereof). The element 52 is located in a bore within the coating block.

The fasteners continue to rotate (again about a longitudinal axis) while passing under the irradiation assembly 10 (rotation being effected by the second conveyor 8). The emitted UV light (radiation) from the assembly 10 is arranged to irradiate the coating layers 9 of product so as to cure the composition so that it is dry to touch. The apparatus further comprises a feed—in means (fastener feeder) 15 which will, together with the remainder of the apparatus, be described in more detail with reference to FIGS. 2-4.

The apparatus of the invention sits on a support structure, which has been labelled 20. The apparatus has a fastener feeder 15 for feeding fasteners one by one to the first conveyor belt tray. As seen in FIG. 2 an air blower 51 is provided for blowing air of a temperature selected for the fasteners. In particular the air blower 51 is of the type usually described as an air knife blower. The blower 51 is arranged to heat at least that portion of the fasteners to which the composition will be applied as they pass through the fastener feeder 15.

As can been seen from FIG. 2 the belt 3 runs in a series of pulley wheels 22 arranged in line. The belt 3 is driven by a motorised pulley wheel 23. An adjustable (tensioning) pulley wheel 24 is provided which can be used to tension the belt 3 as appropriate. All of the pulley wheels are supported on an adjustable support frame 21.

In particular an adjusting mechanism is provided which is operated by rotation of a hand wheel 25. In particular the relative distance between the belt 3 and the support 20 can be adjusted to accommodate different sizes of bolts. In particular the distance between the belt 3 and the support rail 4 (see FIGS. 1 and 3-4) can be adjusted so that different sizes of fasteners can be accommodated between the belt and the support rail 4. As described with reference to FIG. 1 the coating block 5 is also provided for application of composition to at least a portion of each of the fasteners 2.

The belt 8 works in an analogous fashion running across pulley wheels 26 and been driven by a motorised pulley wheel 27 and tensioned by a further tensioning wheel 28. The belt 8 and its associated pulley wheels 26-28 are all mounted on an adjustable support 30 which can be adjusted by turning handwheel 29 to alter the vertical distance between the belt 8 and the guide rail 4 (and the second rail 31).

If the fasteners have sufficient momentum, no additional mechanism may be needed to effect transfer of the fasteners from belt 3 to belt 8, as at least certain fasteners may continue to roll along between exiting from belt 3 and before being picked up by belt 8. However it is desirable (especially for smaller fasteners) to provide a transfer mechanism between the two belts.

In the embodiment shown in FIG. 2 the last pulley wheel 37 (last in the direction left to right) and the first pulley wheel 33 (again first in the same direction) have arranged between them a transfer belt 32. The transfer belt 32 does not run directly between pulley wheels 37 and 33. This is because belts 3 and 8 run at different speeds. It is only necessary that the transfer belt 32 is driven at one end and runs on a (free wheeling) separate pulley on the other. In the embodiment the belt 32 turns with the aid of pulley wheel 37 while it free wheels on a separate pulley wheel at its other end (proximate first pulley wheel 26, i.e., wheel 33). As best seen from FIG. 3 the pulley wheel 37 is double grooved having grooves 38 and 39 in which the belts 3 and 32 respectively run. The transfer belt 32 ensures smooth transition of smaller pieces between the two larger belts 3 and 8.

As described with reference to FIG. 1 light assembly 10 is provided to shine UV light on the applied product as discussed.

It will be appreciated that the bolts are continually rotated on a longitudinal axis when passing through the machine. Furthermore the fasteners are in a generally horizontal position. This is advantageous as the light source can be placed above the fastener rather than along side it or beneath it so that it is less likely that product would come off the fasteners 2 and land on the lamp assembly 10. Fasteners exiting the apparatus have been labelled 34 for convenience.

FIGS. 3 and 4 show a more detailed view, which is part sectional. In the view of FIGS. 3 and 4 the fastener feeder 15 has been omitted for the purposes of clarity. As can be seen clearly from these Figures the support 21 can be moved vertically relative to the rails 4 and 31 (which in turn moves the pulley wheels 22-24 and 37 as described previously) by virtue of an adjusting mechanism 40 which is operated by the rotation of handwheel 25. In the view shown in FIGS. 3-4 the rail 31 does not appear as the view has been taken where the coating block 5 forms part of the second rail.

It will be noted from FIGS. 3 and 4 that a guide is provided each side of the fastener to keep the fastener on the rails 4,31 through the entire apparatus. In particular a first guide 43 and a second guide 44 guide the fastener along its travel path. In particular the first guide 43 is in the form of an abutment plate against which the head 45 of the fastener abuts. The second guide 44 is also in the form on abutment plate against which the stem 46 of the fastener abuts. The guides 43,44 maintain the fastener on its path by preventing any substantial movement of the fasteners transversely across the rails.

It will be noted that the spacing between the rail 4 the guide 43 is such that they form stops on opposing sides of the head (i.e. arranged to abut the top side and the underside of the head of the fastener) thus preventing the fasteners from moving off line to any great extent (by restricting movement of the head). The rail 4 and the guide 43 assist in preventing the fasteners arranging themselves in a diagonal direction across the rails.

All of support 21 and the pulleys belts etc. are supported by the adjustment mechanism 40 and movement thereof allows the relative vertical distance between the rails 4 and 31 and in particular the belt 3 to be adjusted.

Six rods 41, 42, 47-50 (see FIG. 2) arranged substantially horizontally and vertically spaced apart form part of an adjustment mechanism which is arranged to allow for adjustment of the apparatus to accommodate differently sized fasteners 2 (in particular those of greater length). Only two of the rods 41 and 42 are shown in view of S FIG. 3. In particular a slide mechanism operates along rods 41, 42 to allow adjustment of the apparatus in an essentially horizontal direction. In particular a clamp or lock 35 can be released which allows for the substantially horizontal movement of support 21 and all of its associated components together with the coating block 5, (block 5 moves on support 36) rail 31 and guide 44 to be moved closer or further away from the remainder of the apparatus (for example rail 4). This allows for in particular longer fasteners to be coated using the apparatus of the invention.

The rail 4 and the first guide 43 are adjustable relative to each other so that the distance between them can be selected allowing for use of the apparatus with fasteners having differently sized heads.

An enlarged end view of part of the apparatus shown in FIG. 2 can be seen in FIG. 4. Additionally shown in FIG. 4 is a reservoir 54 which together with an air-pressurised line feeds composition held in the reservoir to the eccentric rotor pump 53. The eccentric rotor pump is connected directly to the coating block 5 by a rigid connection to reduce losses in control of the amount being dispensed by length and/or flexing of the conduit.

Figure 5:
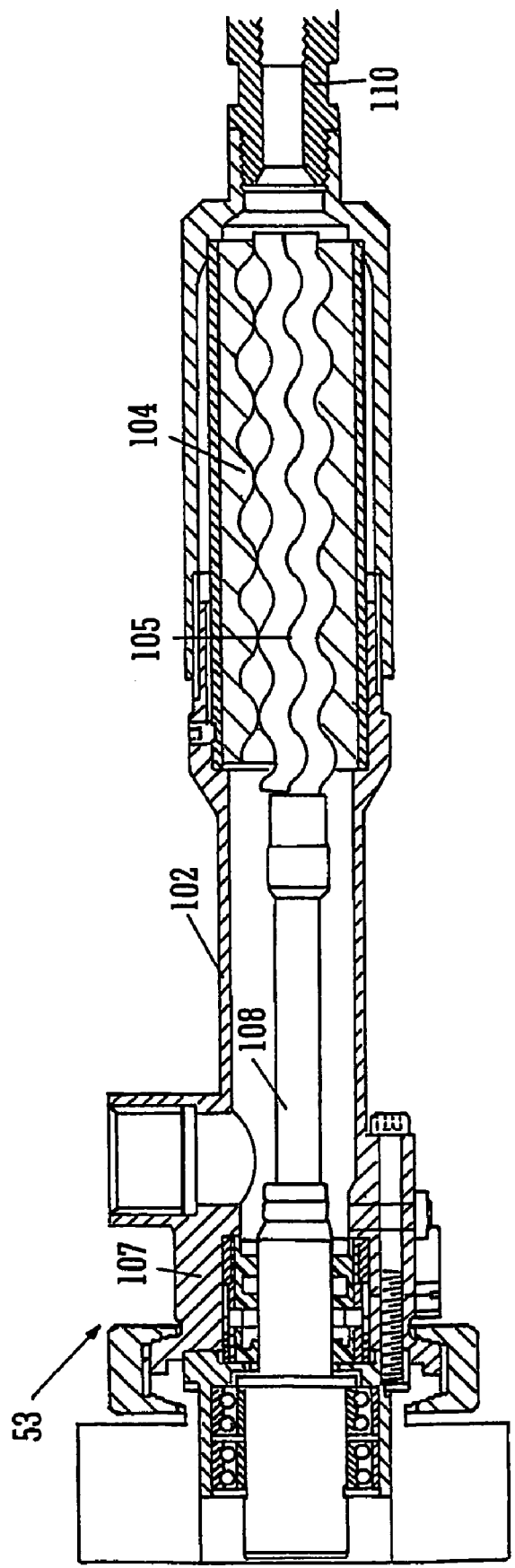
FIG. 5 shows a cross-sectional view of an eccentric rotor pump for use in a feed supply system/apparatus of the invention.

More detail of the eccentric rotor pump 53 is shown in FIG. 5, which gives a cross-sectional view of a suitable pump. The eccentric rotor pump 53 has a pump housing 102 with a rotor 108, which is mounted on a driven assembly 107. The rotor is connected to helical pump elements 105, which are arranged in a general double helix arrangement within a stator 104. Driving of the rotor 108 also rotates elements 105 and causing a pumping action toward the outlet end 110 of the pump 53.

The process is carried out as follows:

The fasteners are fed into the first conveyor by a fastener feeder;

The conveyor conveys the bolts across an applicator which applies product to the bolts, the bolts are then transferred to a second conveyor which runs at a different (slower) speed;

The second conveyor conveys the bolts past the UV light source for curing of the product applied in the application station. By the time the bolts leave the second conveyor (see for example the bolts labelled 34 in FIG. 2) they are dry to touch.

EXAMPLES

Figure 7A:
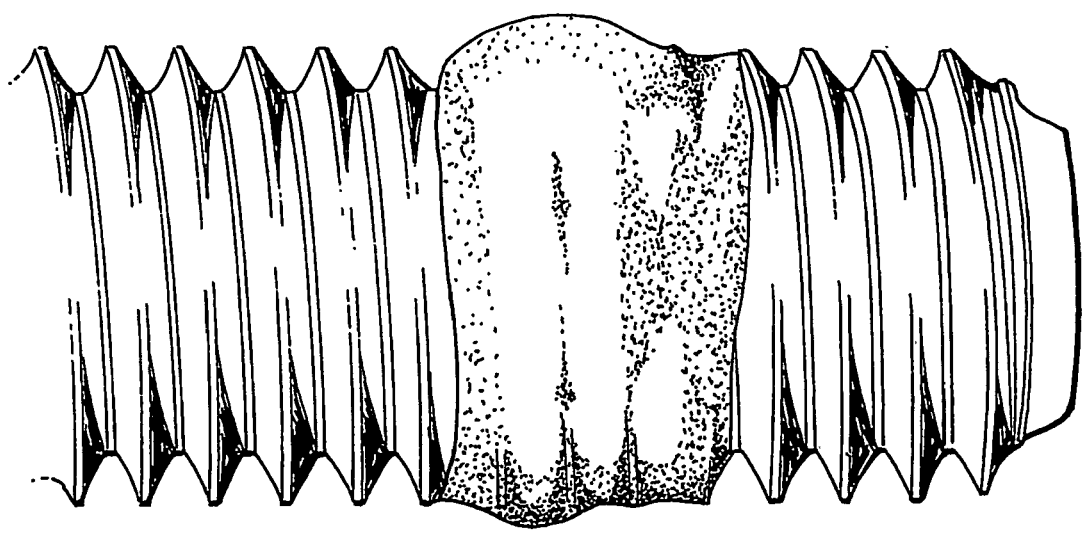
FIGS. 7A and 7B show a picture of a bolt with composition applied thereto.
Figure 7B:
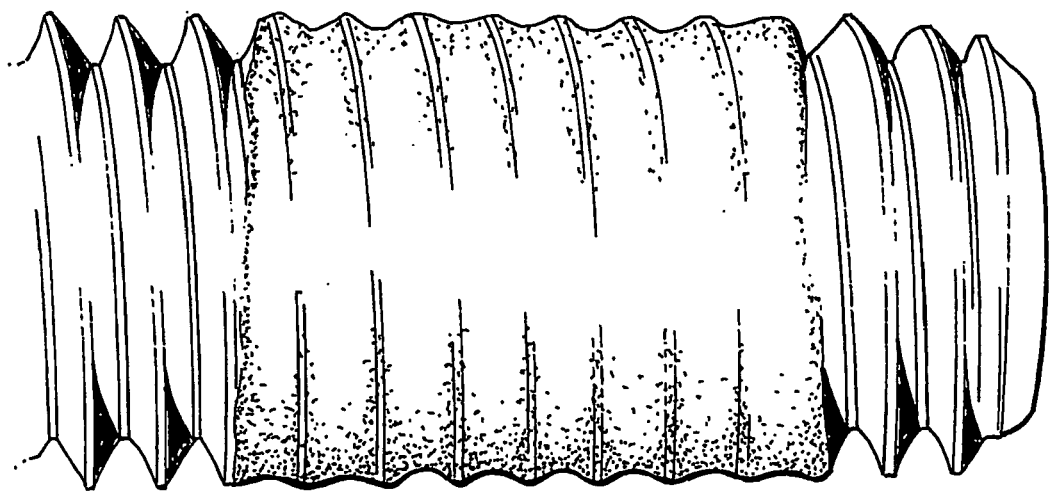

Separate bolts having applied thereto (by an apparatus of the invention as shown in the Figures) a composition according to Example 1 below are shown in FIGS. 7A and 7B. FIG. 7A shows a bolt having a greater than optimal amount of product thereon. As described above and as set out in greater detail below, the amount of product on the bolt which is applied by the apparatus can be controlled so as to provide a desirable (optimal) amount of product such as in FIG. 7B. One of the main controls for the amount of applied product picked up by an article from the applicator is temperature. Working within a selected temperature difference range between the applicator temperature and the article temperature will allow a person skilled in the art to apply product in desired amounts such as is shown in FIG. 7B.

Coating Efficiency Tests

Effect of Bolt and Coating Block Temperatures

This test examined (a) (article) bolt temperature and (b) (applicator) coating block temperature effects on the coating efficiency. The test trials were carried out utilising an apparatus as shown in the drawings and utilising a composition as set out in Example 1 below.

(a) Bolt Temperature Effects

Description:

To examine how changes in bolt temperature affect the coating efficiency, the following settings were kept constant (on the apparatus as shown in the drawings—FIGS. 2-4): bolt feed rate, coating block temperature (30° C.) (conveyor in the applicator station) belt speed and pump speed.

Bolts were preheated to each of temperatures 35° C., 45° C. and 55° C. Samples from each temperature were run through the coating machine and coating weight was calculated for each temperature by weighing a number of samples from each run.

Product not coated onto the bolt was wasted over either the side or the end of the coating bar. The coating efficiency (%) is calculated as follows: (Amount of product coated onto the bolt/amount of product pumped on to the coating bar per bolt)×100.

Results

Figure 6A:
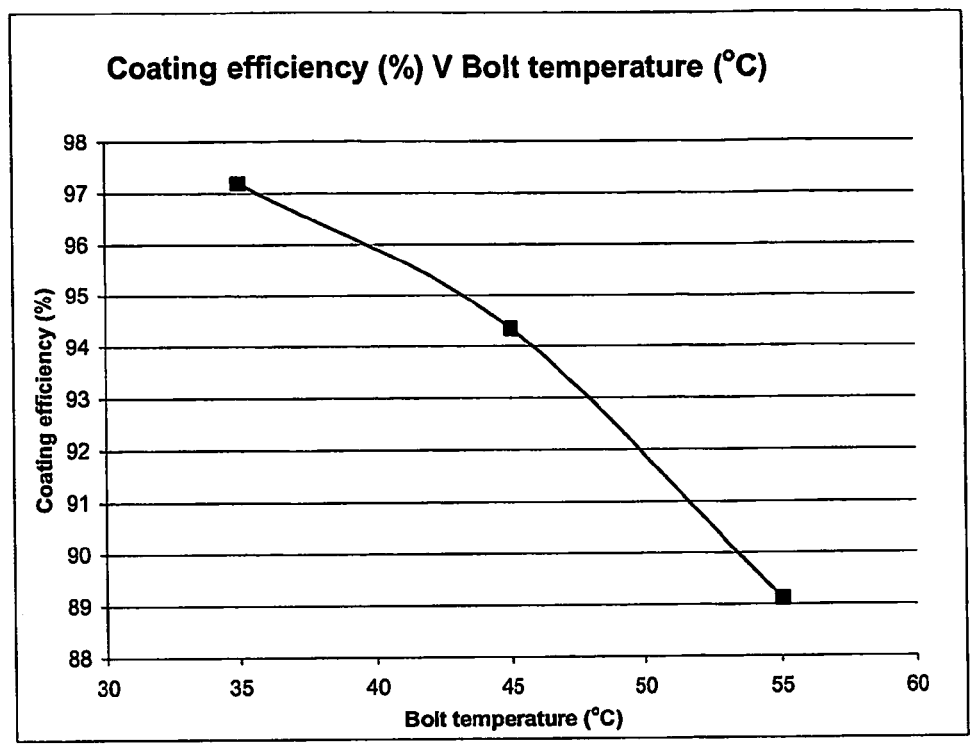
FIGS. 6A and 6B respectively show: applicator (coating block) temperature plotted against coating efficiency; and coating efficiency plotted against (fastener) bolt temperature.

FIG. 6A shows the coating efficiency with varying bolt temperature. More specifically, FIG. 6A shows that an increase in temperature of 20° C. gives a decrease in coating efficiency of 8%, and that preheating bolts to a temperature in the range of 30-40° may give an optimal coating efficiency. Using pre-heated bolts also was observed to provide a homogenous coating layer.

(b) Coating Block Temperature Effects

Description:

To examine coating block temperature effects the bolt temperature was set to 40° C., and the coating bar was run with the following temperatures 25.6° C., 27.5° C., 30° C., 32.5° C. 35° C. The rest of the settings were kept as before. The following graph shows average amount of product picked up per bolt with varying bar temperature.

Figure 6B:
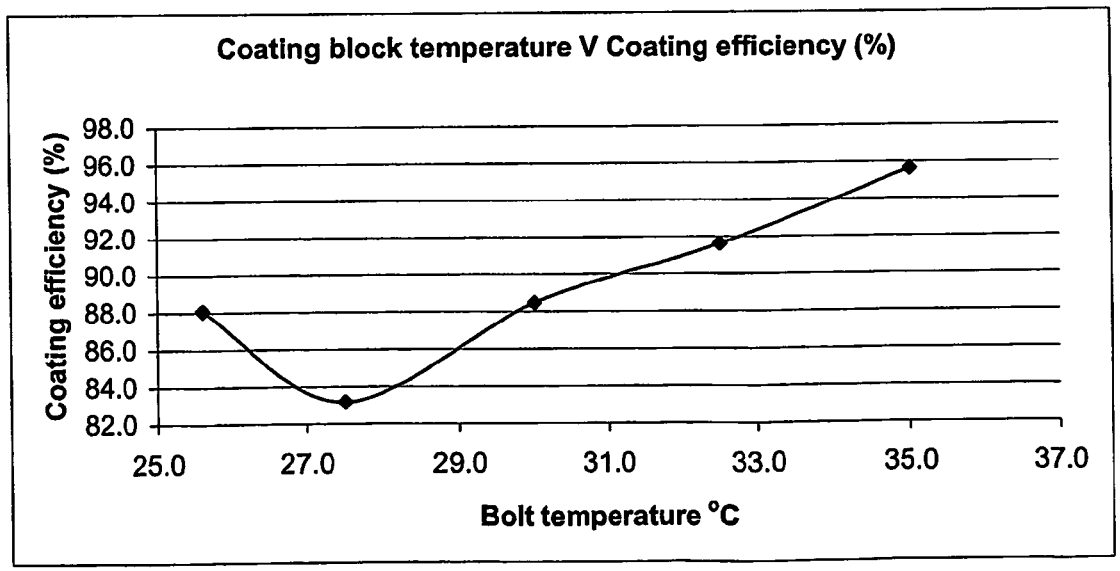

Results:

FIG. 6B shows the coating efficiency with varying coating block temperature (coating block temperature controlled as described above). In this case we see that by raising the coating block (bar) temperature from 26° C. to 35° C. increases the coating efficiency by 7.5%.

As bolt temperature increases, coating weight and coating efficiency decreases. As the temperature of the coating block increases, coating weight and coating efficiency also increase. As all runs produced good quality coatings (as exemplified in FIG. 7B), both bolt and coating block temperature can be used to control the coating efficiency of the system.

UV Acrylate/Epoxy Threadlocking Compositions

A threadlocking formulation according to the invention was made with the components in the table below. The encapsulated epoxy resin was the last component added to the formulation. The epoxy resin was EPON 828, a difunctional bisphenol A/epichlorohydrin derived liquid epoxy resin available from Resolution Performance Products. It was encapsulated in double walled gelatine/PMU capsules. Photomer 4039 is an ethoxylated (3) phenol monoacrylate (available from Cognis). Ebecryl 3500 is an acrylate epoxy oligomer (available from UCB/Radcure) used for speed of cure. Ebecryl 270 is an aliphatic urethane acrylate oligomer (also available from UCB/Radcure) used for enhancing flexibility. Flex Resin II (available from Henkel Loctite) is used for enhancing flexibility. The components other than the microencapsulated epoxy are given in amounts based on w/w of the composition excluding the microencapsulated epoxy. The part of the composition excluding the epoxy microcapsules (hereinafter "acrylate portion") and the epoxy microcapsules were combined in the following ratio by weight: 59.41 parts acrylate potion to 40.59 parts epoxy microcapsules. This ratio is employed in all Examples.

Example 1

TABLE 1

% weight of components in the part of the composition excluding the microencapsulate epoxy component

| Component | % weight |
|---|---|
| Photomer 4039 | 21.53 |
| N,N Dimethylacrylamide | 13.78 |
| Ebecryl 3500 | 30.14 |
| Ebecryl 270 | 14.64 |
| Diphenyl(2,4,6-trimethylbenzoyl)phosphine oxide | 1.73 |
| 1-Hydroxycyclohexyl phenyl ketone | 4.3 |
| Polymethyl methacrylate granules (PMMA) | 1.96 |
| Silica | 3.3 |
| Dipyr | 8.62 |

The viscocity of this composition excluding the microencapsulated epoxy component, when measured with a Haake Roto Visco 1, c60/1° Cone, shear rate 244 s$^{-1}$, was 1,326 mPas.

Example 2

TABLE 2

% weight of components in the part of the composition excluding the microencapsulate epoxy component

| Component | % weight |
|---|---|
| Photomer 4039 | 21.96 |
| N,N Dimethylacrylamide | 14.06 |
| Ebecryl 3500 | 30.74 |
| Flex Resin II | 14.93 |
| Diphenyl(2,4,6-trimethylbenzoyl)phosphine oxide | 1.76 |
| 1-Hydroxycyclohexyl phenyl ketone | 4.39 |
| Silica | 3.37 |
| Dipyr | 8.79 |

The viscocity of this composition excluding the microencapsulated epoxy component, when measured as in Example 1, was 731 mPas.

Application of Product

A composition according to each of the Examples above (including the microencapsulated epoxy component) was applied to threaded bolts. The composition was irradiated for 3 to 4 seconds at an intensity of 60 mW/cm$^2$ provided by a medium pressure iron doped mercury vapour lamp. Irradiation of coated parts left a dry to touch coating.

A composition according to each of the Examples above has a shelf life of at least 6 months at 5° C. The microencapsulated epoxy component has an indefinite shelf life. A composition according to the Examples above including the microencapsulated epoxy component has a shelf life of at least one week. The composition can be stored for use in either a one-part or a two-part format. When formulated as a two-part composition, one part of the composition may comprise a composition according to each of the Examples above and a second part will usually contain the microencapsulated epoxy component. Threaded bolts which have had a composition according to the Examples above including the microencapsulate epoxy component applied to them and UV cured have a shelf life of at least one year. Break/prevail values in the region of 20 Nm have been recorded from assemblies of M10 mild steel black oxide bolts and M10 mild steel nuts following a 72 hour cure of the composition according to each of the Examples above (including the microencapsulated epoxy component) at room temperature.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

The words "comprises/comprising" and the words "having/including" when used herein with reference to the present invention are used to specify the presence of stated features, integers, steps or components but does not preclude the presence or addition of one or more other features, integers, steps, components or groups thereof.

The invention claimed is:

1. An apparatus for the application of a composition curable by irradiation to a fastener having an externally threaded stem, comprising:
    a coating section, including:
        a coating conveyor for conveying the fastener in a horizontal position to an application station, the coating conveyor comprising a rail parallel to, and horizontally separated from, an application surface and a first endless drive element vertically separated from the rail and the application surface, wherein the fastener stem spans the rail and the application surface and is rotated over the rail and application surface and under the first endless drive element, and
        the application station from which the composition is dispensed onto the application surface, wherein the fastener stem is rotated through the dispensed composition by rolling movement over the rail and the application surface and under the first endless drive element for application of a circumferential band of composition to the fastener stem; and
    a curing section, including:
        a curing conveyor for conveying the fastener in a horizontal position to an irradiation station, the curing conveyor comprising two, parallel, horizontally separated rails and a second endless drive element vertically separated from the rails, wherein the fastener stem having the circumferential band of composition thereon spans the rails and is rotated over the rails and under the second endless drive element as it moves toward the irradiation station; and
        the irradiation station for at least partially curing the composition applied to the fastener stem.

2. An apparatus according to claim 1 wherein the composition is an at least two stage curable composition; the curable composition having a first cure stage which is activatable by irradiation, and a second cure stage which is curable to secure the fastener in a fastening position.

3. An apparatus according to claim 1 further comprising a fastener feeder for feeding fasteners one by one to the coating conveyor.

4. An apparatus according to claim 1 wherein the coating conveyor extends through the application station.

5. An apparatus according to claim 1 wherein the application surface is a horizontal surface of a coating block.

6. An apparatus according to claim 1 wherein the vertical separation between the first endless drive element and the application surface can be altered by a user.

7. An apparatus according claim 1 further comprising temperature control means for regulating the temperature of the fastener prior to application of composition thereto.

8. An apparatus according to claim 1 wherein the apparatus further comprises a transfer mechanism for transferring the fasteners from the coating conveyor to the curing conveyor.

9. An apparatus according to claim 1 comprising a supply system supplying curable composition to the application surface.

10. An apparatus according to claim 1 wherein the irradiation station comprises a UV light source for irradiating applied composition with UV light.

11. An apparatus according to claim 1 wherein the irradiation station comprises a radiation source housed in an enclosure which emits radiation through an aperture therein.

12. An apparatus for applying an at least partially cured composition to a fastener having an externally threaded shank, comprising:
    a coating conveyor comprising two spaced supports defining a first fastener feed plane and a coating conveyor drive element spaced from the first plane, wherein the fastener shank can be disposed between the two spaced supports and the coating conveyor drive element and the fastener can be rolled on the two spaced supports from a fastener feed position toward a coating station by contact with the coating conveyor drive element;
    the coating station comprising a support spaced from a coating block and a coating station drive element spaced from the coating block, the coating block comprising an application surface onto which a curable composition can be dispensed, wherein the fastener shank can be disposed between the coating block and the coating station drive element and the fastener can be rolled on the support and the application surface by contact with the coating station drive element as it moves through the dispensed curable composition;
    a curing conveyor comprising two spaced supports defining a second fastener feed plane and a curing conveyor drive element spaced from the second plane, the curing conveyor extending from a coated fastener feed position toward a fastener exit position, wherein the coated fastener shank can be disposed between the two spaced supports and the curing conveyor drive element and the fastener can be rolled on the two spaced supports by contact with the curing conveyor drive element as it moves toward the exit position; and
    a radiation source capable of providing a beam of energy intersecting the second plane and the coated fastener shank.

13. The claim of 12 wherein the first fastener feed plane is horizontal.

14. The claim of 12 wherein the first and second fastener feed planes are coextensive.

15. The claim of 12 further comprising a fastener transfer mechanism between the coating conveyor and the curing conveyor.

16. The claim of 12 further comprising a transfer conveyor comprising two spaced supports defining a transfer fastener feed plane and a transfer drive element spaced from the transfer plane, the transfer conveyor extending from the coating station to the curing conveyor, wherein the coated fastener shank can roll between the two spaced supports and the transfer drive element as it moves toward the curing conveyor.

17. The claim of 12 wherein the coating conveyor two spaced supports and curing conveyor two spaced supports are fixed and the coating conveyor drive element and the curing conveyor drive element are different, movable, endless loops of material.

18. The claim of 12 wherein the coating conveyor two spaced supports and curing conveyor two spaced supports are fixed, the coating conveyor drive element moves at a first speed and the curing conveyor drive element moves at a second speed different than the first speed.

19. The claim of 12 wherein the distance between the first plane and the coating conveyor drive element and the distance between the second plane and the curing conveyor drive element are independently adjustable.

* * * * *